(12) United States Patent
Cheon

(10) Patent No.: US 7,286,355 B2
(45) Date of Patent: Oct. 23, 2007

(54) COOLING SYSTEM FOR ELECTRONIC DEVICES

(76) Inventor: Kioan Cheon, 2840 W. Valley Hwy. North, Auburn, WA (US) 86001

( * ) Notice: Subject to any disclaimer, the term of this patent is extended or adjusted under 35 U.S.C. 154(b) by 0 days.

(21) Appl. No.: 11/298,061

(22) Filed: Dec. 10, 2005

(65) Prior Publication Data

US 2006/0098409 A1    May 11, 2006

Related U.S. Application Data

(63) Continuation-in-part of application No. 10/761,503, filed on Jan. 20, 2004, which is a continuation-in-part of application No. 10/241,118, filed on Sep. 11, 2002, now abandoned.

(51) Int. Cl.
*H05K 7/20* (2006.01)
*F28F 7/00* (2006.01)
*F28D 15/00* (2006.01)

(52) U.S. Cl. ............... 361/699; 361/719; 361/720; 165/46; 165/80.4; 165/104.33

(58) Field of Classification Search ............ 361/699, 361/704, 707, 710, 719; 165/46, 80.4, 80.5, 165/104.21, 104.33; 108/147.18; 403/110; 257/718, 719; 248/505, 510
See application file for complete search history.

(56) References Cited

U.S. PATENT DOCUMENTS

| | | | | |
|---|---|---|---|---|
| 2,339,515 | A * | 1/1944 | Parcher | 602/20 |
| 4,997,032 | A * | 3/1991 | Danielson et al. | 165/46 |
| 5,245,508 | A * | 9/1993 | Mizzi | 361/694 |
| 5,502,582 | A * | 3/1996 | Larson et al. | 349/62 |
| 5,740,018 | A * | 4/1998 | Rumbut, Jr. | 361/720 |
| 6,205,023 | B1 * | 3/2001 | Moribe et al. | 361/704 |
| 6,496,369 | B2 * | 12/2002 | Nakamura | 361/697 |
| 6,871,829 | B2 * | 3/2005 | Shannon, Jr. | 248/505 |
| 6,963,490 | B2 * | 11/2005 | McClary | 361/704 |

FOREIGN PATENT DOCUMENTS

JP         03030399 A  *  2/1991

* cited by examiner

*Primary Examiner*—Jayprakash Gandhi
*Assistant Examiner*—Robert J. Hoffberg
(74) *Attorney, Agent, or Firm*—Delbert J. Barnard

(57) ABSTRACT

A plurality of pouch bodies (14, 16, 18) are supported side-by-side from an assembly that includes a manifold block (26). The manifold block (26) includes an inlet manifold (28) and an outlet manifold (30). A liquid coolant (e.g. water) is delivered into the inlet manifold (28) via an inlet fitting (32). The liquid flows from the inlet manifold (28) into and through inlet passageways (36) which connect the inlet manifold (28) with inlet fittings (22) leading into a common end of the pouch bodies (14, 16, 18). The cooling liquid flows into the pouch bodies (14, 16, 18) and through them to outlet fittings (24) at the opposite ends of the pouch bodies (14, 16, 18). The coolant flows from the outlet fittings (24) through outlet conduits (38) to and into the outlet manifold (30). The coolant flows from outlet manifold 30 out through an outlet port (34). Electronic components to be cooled are placed between the pouch bodies (14, 16, 18).

14 Claims, 5 Drawing Sheets

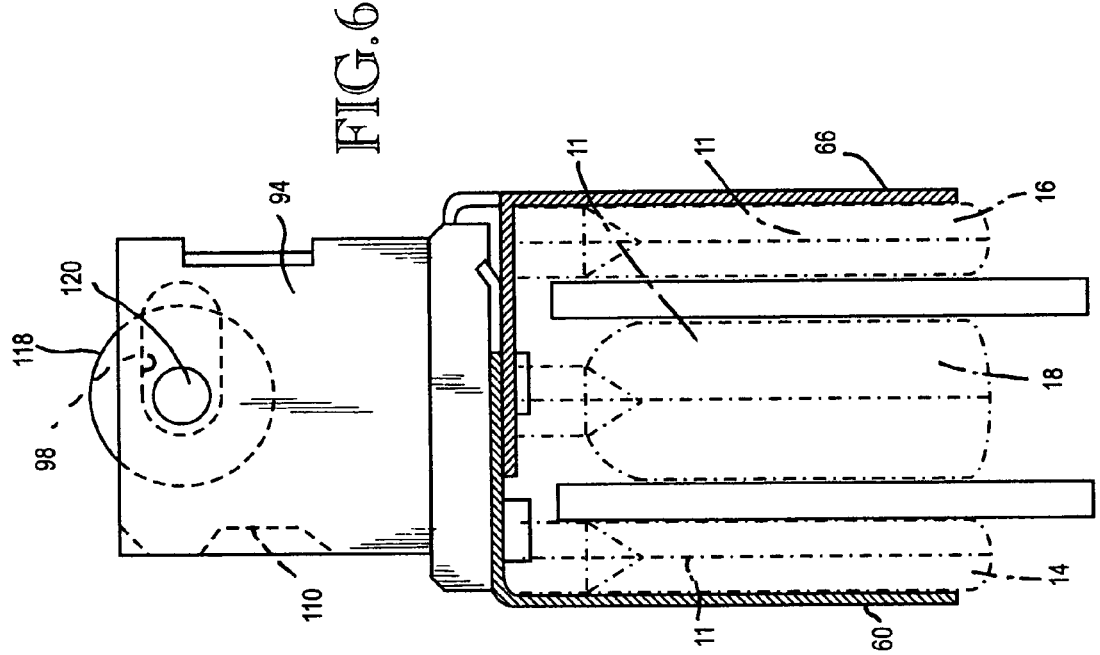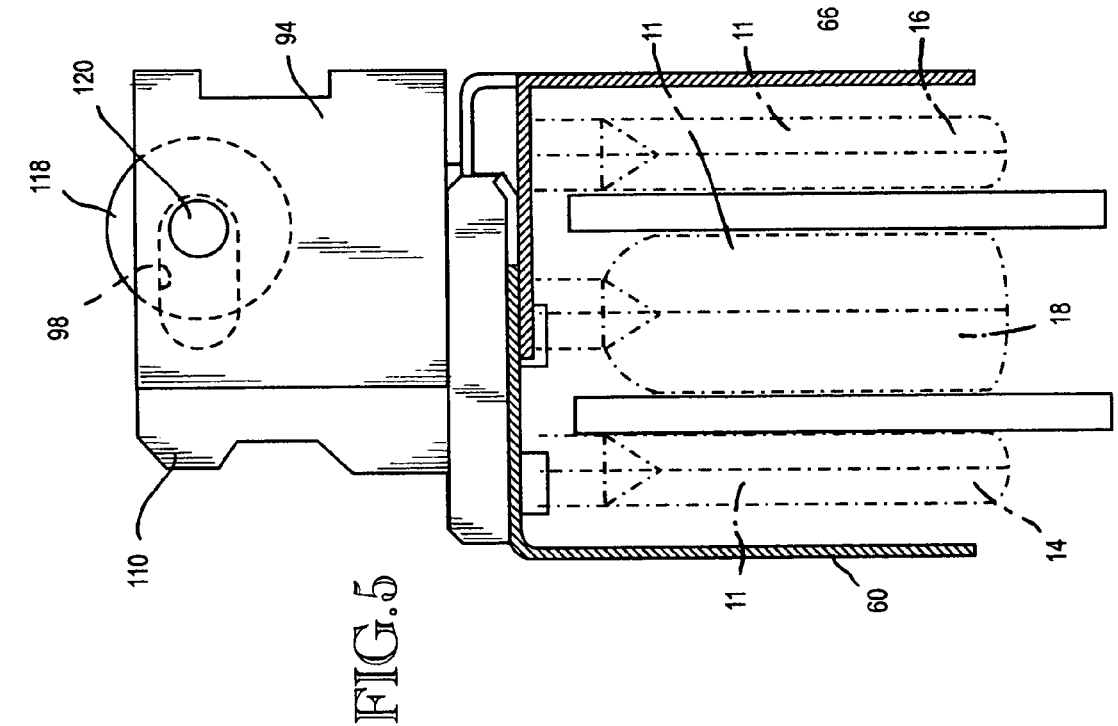

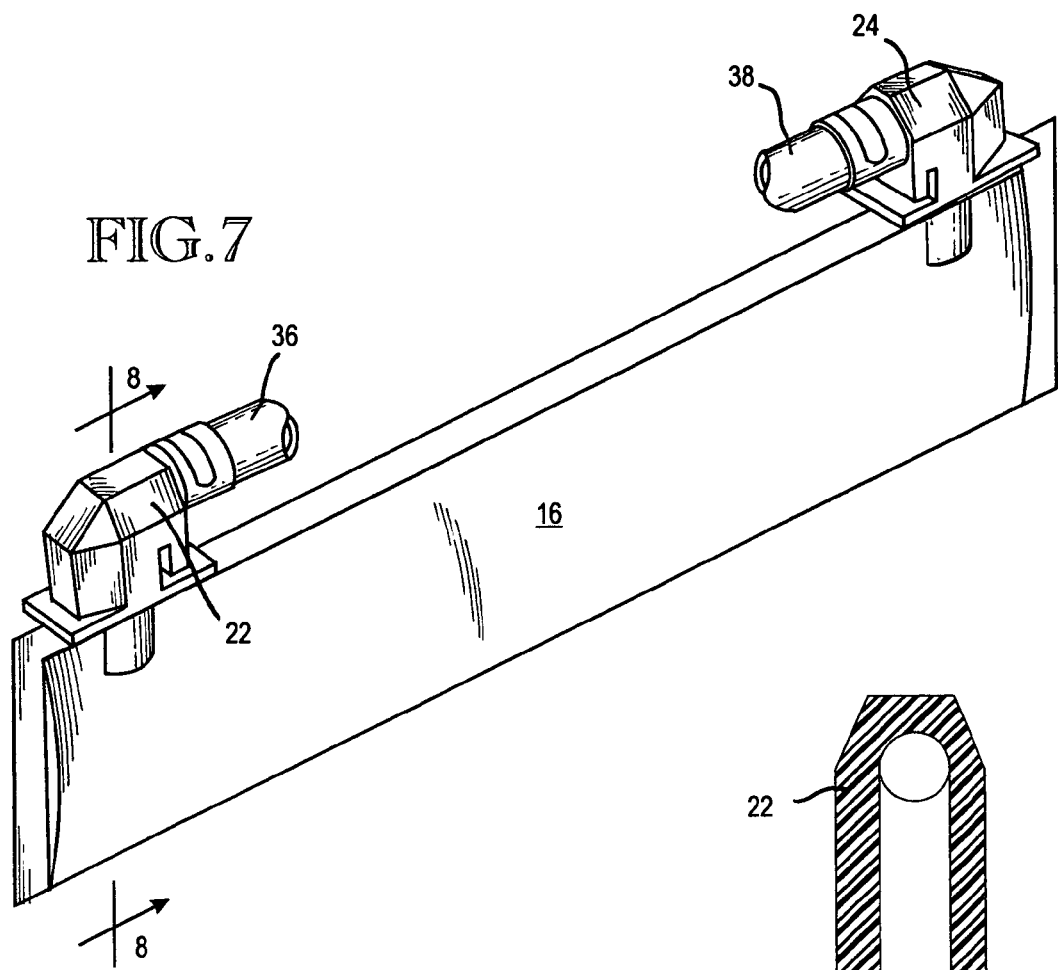
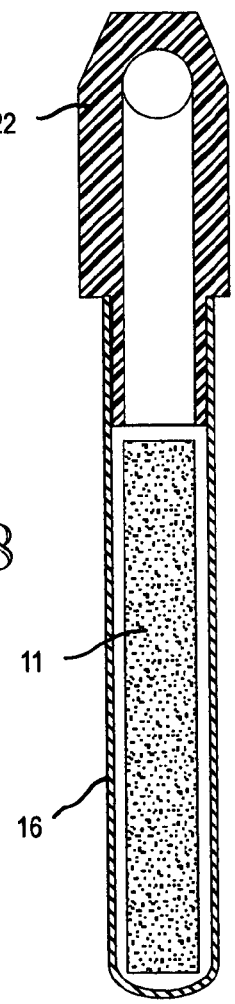

COOLING SYSTEM FOR ELECTRONIC DEVICES

RELATED APPLICATION

This is a continuation-in-part of U.S. Ser. No. 10/761,503, filed Jan. 20, 2004, as a continuation-in-part of application Ser. No. 10/241,118, filed Sep. 11, 2002 now abandoned.

TECHNICAL FIELD

This invention relates to a cooling system for electronic components utilizing a liquid coolant. More particularly, it relates to such a system comprising a plurality of pouch bodies, each formed of a flexible sheet material making the pouch body deformable, so that the pouch bodies can be moved against and conform in shape to uneven surfaces. Cooling fluid is circulated through the pouch bodies for cooling objects having the uneven surfaces.

BACKGROUND OF THE INVENTION

It is well known that computers include components that produce heat. Various types of cooling systems have been proposed for removing heat from the computer components to maintain the computer within acceptable operating temperature limits. The prior art includes cooling systems utilizing a cooling liquid, such as water and a cooling gas, such as air. The conventional liquid coolant systems comprise cooling blocks formed of hard materials such as metal. It is difficult to make these blocks in such a way that they can be put into contact with uneven surfaces. Also, the cooling blocks are difficult to directly install on such electronic devices as hard-disk drives, video cards, memory cards, or a PCB.

Conventional air-cooling systems deliver air into direct contact with the surfaces that are to be cooled. Heat absorptivity is low, resulting in a pour cooling efficiency.

The known systems include the systems disclosed by my U.S. Pat. No. 5,731,954, granted Mar. 24, 1998, and entitled Cooling System For Computer, by my U.S. Pat. No. 6,234,240, granted May 22, 2001, and entitled Fanless Cooling System For Computer, by my U.S. Pat. No. 6,313,990, granted Nov. 6, 2001, and entitled Cooling Apparatus For Electronic Devices, and by my U.S. Pat. No. 6,664,627, granted Dec. 19, 2003, and entitled Water Cooling Type Cooling Block For Semiconductor Chip.

There is a need for a cooling system that uses a liquid coolant and places the coolant into close proximity with the object to be cooled. A principal object of this invention is to provide that need.

BRIEF SUMMARY OF THE INVENTION

The cooling system of the invention comprises first and second pouch bodies, each formed of sheet material that is deformable. Each pouch body has first and second ends, an inlet for a cooling fluid at its first end and an outlet for the cooling fluid at its second end. Preferably, an elongated support is provided, and the first and second pouch members are connected to the support, and inlet and outlet manifolds are provided. Inlet conduits extend from the inlet manifold to the inlets for the pouches. Outlet conduits extend from the outlets for the pouches to the outlet manifold.

Preferably, a first presser plate is positioned outside of the first pouch body and a second presser plate is positioned outside of the second pouch body. The presser plates are movable relatively together and apart.

Preferably also, a first clamp is positioned endwise of first ends of the pouch bodies and a second clamp member is positioned endwise of second ends of the pouch bodies. The clamps have spaced apart jaws which are movable together and apart.

Other objects, advantages and features of the invention will become apparent from the description of the best in the mode set forth below, from the drawings, from the claims and from the principles that are embodied in the specific structures that are illustrated and described.

BRIEF DESCRIPTION OF THE SEVERAL VIEWS OF THE DRAWINGS

Like reference numerals are used to designate like parts throughout the several views of the drawing, and:

FIG. 5 is a cross sectional view taken substantially along line 5-5 of FIG. 3, showing a first card positioned between the first and third coolant pouches and a second card positioned between the second and third coolant pouches, and showing the presser members in a spread position;

FIG. 6 is a view like FIG. 5 but showing the presser members moved towards each other, into contact with the first and second pouch bodies for pressing them against the two cards that are being cooled on further pressing the two cards against the center pouch body.

FIG. 7 is a pictorial view of one of the pouch bodies, taken from above and looking towards one side, the top and one end of the pouch body; and FIG. 8 is a sectional view taken substantially along line 8-8 of FIG. 7.

DETAILED DESCRIPTION OF THE ILLUSTRATED EMBODIMENT

Figure 1:
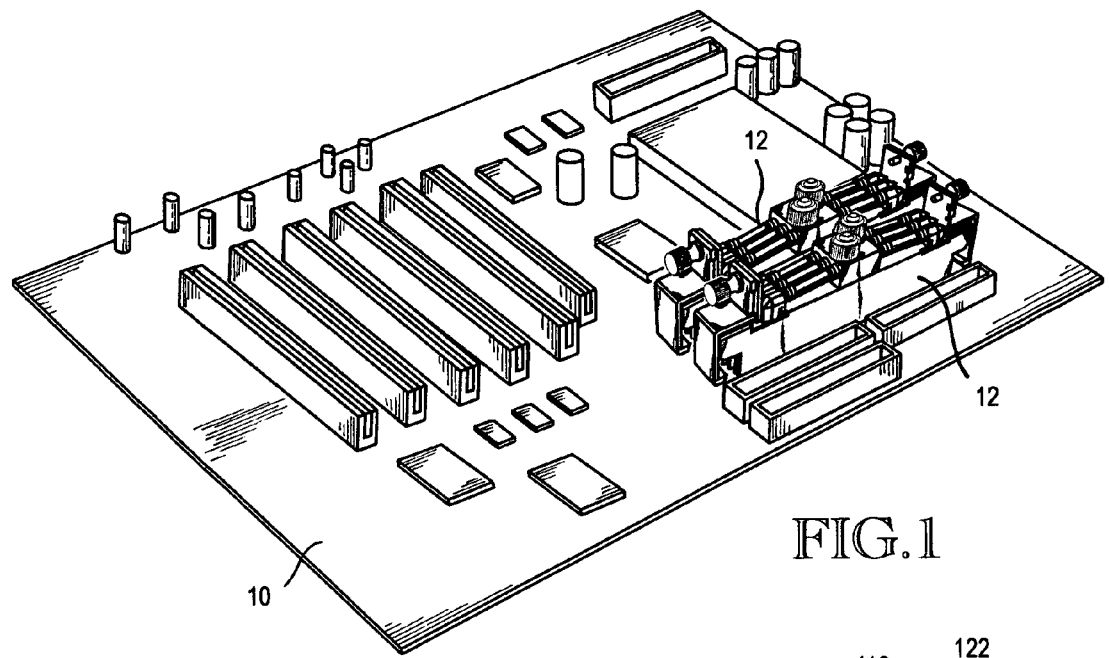
FIG. 1 is a pictorial view of a board supporting computer components, showing an embodiment of the invention installed onto components of the system.
Figure 2:
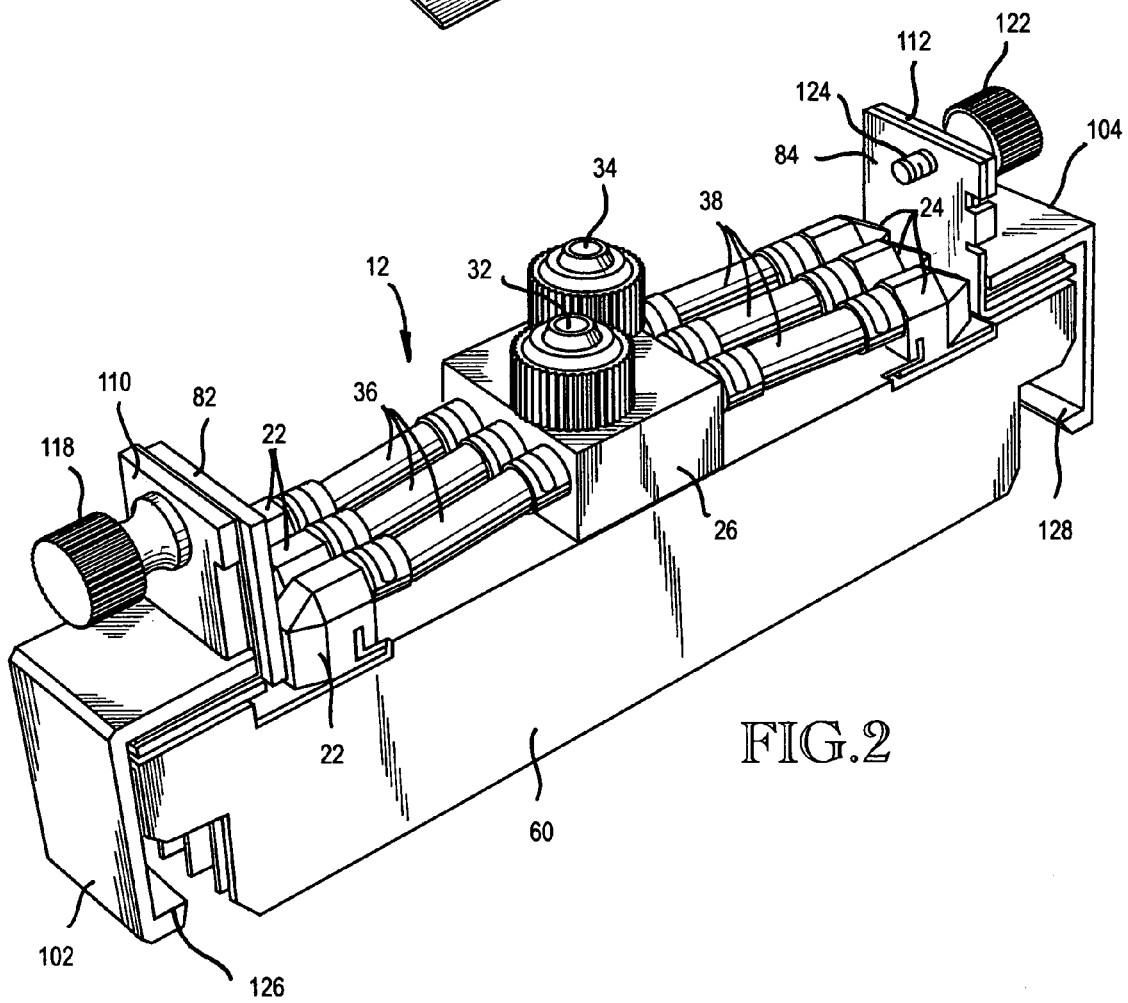
FIG. 2 is a pictorial view of a cooling assembly shown in FIG. 1, such view being taken from above and looking towards the top, one end and one side of the assembly.
Figure 3:
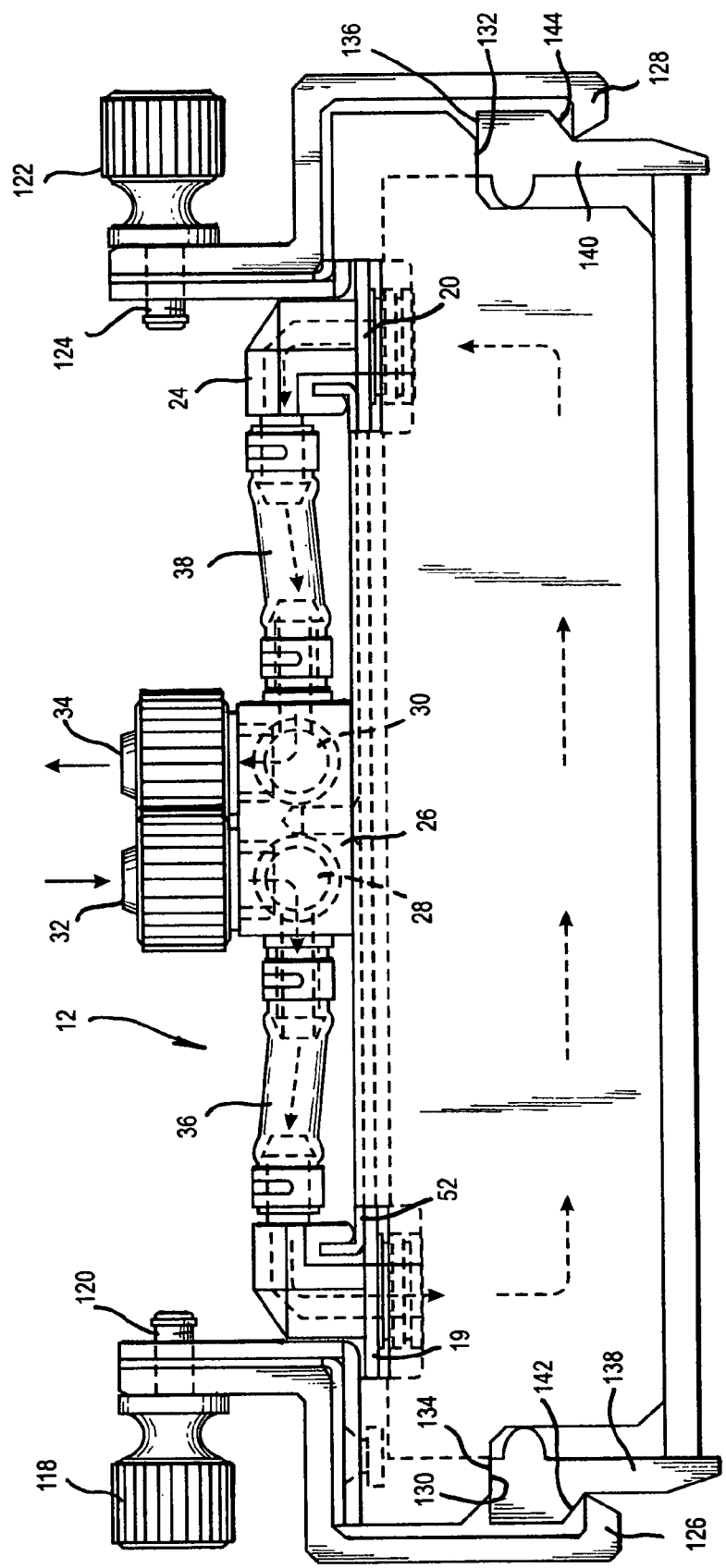
FIG. 3 is a side elevation of the cooling assembly shown by FIG. 2, including arrows showing the flow path of a liquid coolant.
Figure 4:
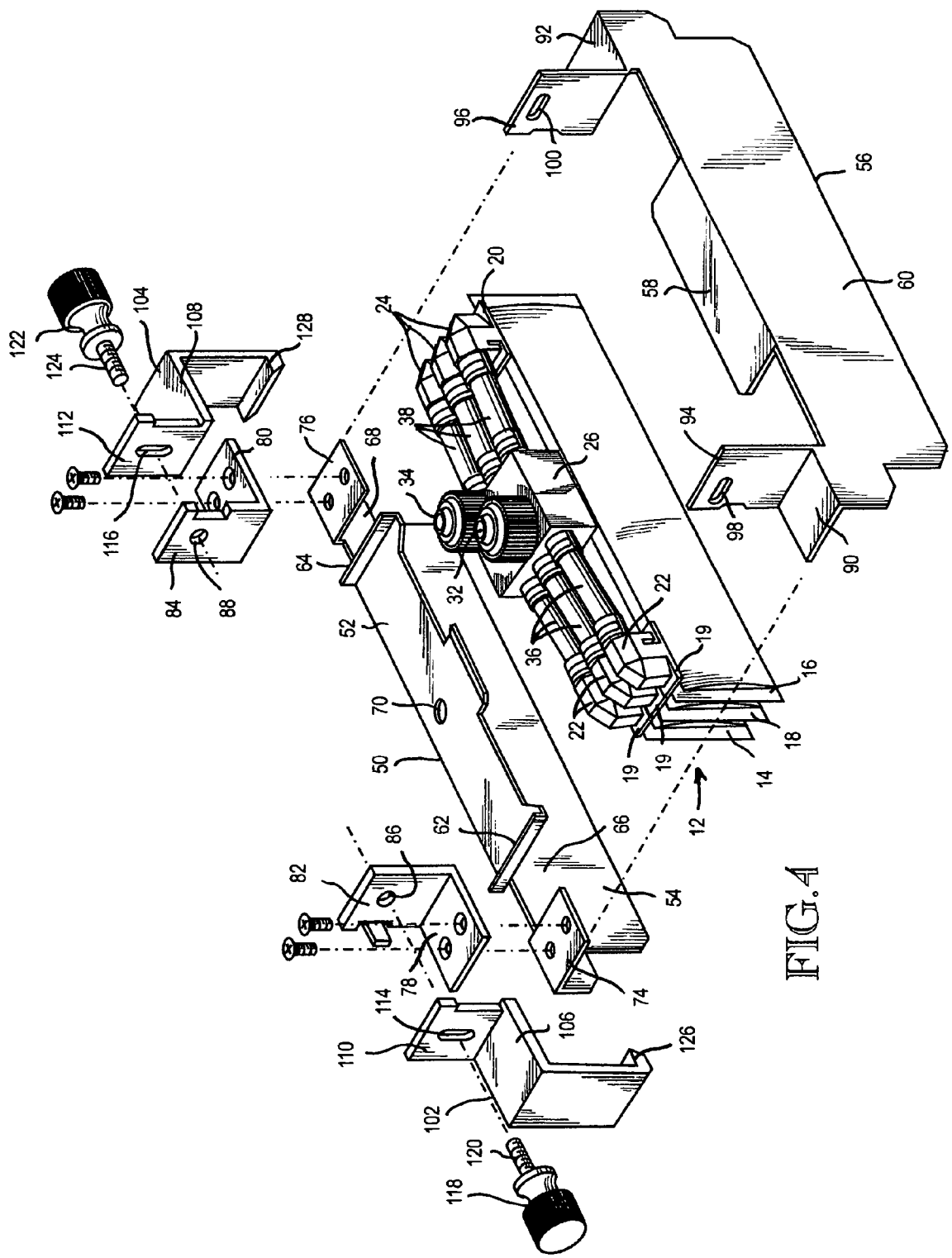
FIG. 4 is an exploded pictorial view of the cooling assemblies shown by FIGS. 2 and 3.

FIG. 1 shows a mounting board 10 for electronic components that are parts of a computer, for example. FIG. 1 shows two side-by-side cooling assemblies 12. FIGS. 2-4 show one of the cooling assemblies 12. The cooling assembly 12 comprises a plurality of pouch bodies formed of sheet material that is deformable. The illustrated embodiment comprises three poach bodies and they are designated 14, 16, 18. These pouch bodies may be constructed in the manner disclosed in U.S. Ser. No. 10/761,503, the contents of which is hereby incorporated herein. Herein, pouch body 14 is sometimes referred to as the first pouch body. Pouch body 16 is sometimes referred to as the second pouch body. Pouch body 18 is sometimes referred to as the third pouch body. The first and second pouch bodies 14, 16 are positioned at the sides of the assembly 12. Pouch body 18 and any additional pouch bodies are positioned between the pouch bodies 14, 16. Pouch bodies 14, 16, 18 are positioned in a side-by-side relationship.

In preferred form, support plates 19 are provided above the first ends of the pouch bodies 14, 16, 18. Similar support plates 20 (FIG. 4) are positioned above the second ends of the pouch bodies 14, 16, 18. Each plate 19 includes a fitting 22 and each plate 20 includes a fitting 24. One of the fittings 22, 24 is an inlet fitting and the other is an outlet fitting. For example, fittings 22 may be the inlet fittings and fittings 24 may be the outlet fittings.

The assembly 12 is provided with a manifold block 26. In the illustrated example, manifold block 26 includes an inlet manifold 28 and an outlet manifold 30. Manifold block 26 includes an inlet fitting 32 and an outlet fitting 34. As shown by FIGS. 2 and 4 the inlet fittings 22 are connected to the inlet manifold 28 by inlet passageways 36. The outlet manifold 30 is connected to the outlet fittings 24 by outlet passageways 38. A liquid coolant (e.g. water) is delivered into the inlet manifold 28 via the inlet 32. This coolant flows into the manifold 28 and from the manifold 28 into the inlet passageways 36 to and through the inlet fittings 22 into the inlet end of the pouch bodies 14, 16, 18. The arrows in FIG. 3 show the flow path of the liquid coolant.

FIG. 4 shows support structure for the assembly of pouch bodies 14, 16, 18. It comprises a first side part 50 comprising a top 52 and a first presser member 54 depending from the top. A second support member 56 has a top 58 and a second side presser member 60 depending from the top 58. Member 52 has upwardly extending end portions 62, 64 that fit within slots formed in the inlet and outlet fittings 22, 24. This fit is shown by FIG. 3. The inlet fittings 22 fit within a space 66 and the outlet fittings 24 fit within a space 68. Top 52 extends under the manifold assembly 26. A screw extends upwardly through an opening 70 formed in the top 52 and screws into the bottom of the manifold block 26, at a solid location between the two manifolds 26, 28. Support member 50 includes mounting plates 74, 76 on which base plates 78, 80 fit. Plates 74, 78 are connected together by screws and plates 76, 80 are connected together by screws.

An ear 82 projects upwardly from plate 78. An ear 84 projects upwardly from plate 80. Ear 82 includes a threaded screw receiving opening 86 and ear 84 includes a threaded screw receiving opening 88. When support member 50 is connected to the manifold block 26, the top 58 of support member 56 slides under the top 52. This positions base 90 on top of base 78 and places base 92 on top of base 80. An ear 94 extends upwardly from base 90. An ear 96 extends upwardly from base 92. Ear 94 includes a sideways slot 98. Ear 96 includes a sideways slot 100. When the bases 90, 92 are on the bases 78, 80, the slots 98, 100 are in registry with the threaded openings 86, 88. The clamp member 102 is located endwise outwardly of one end of the assembly 12. A clamp 104 is located endwise outwardly of the opposite end of the assembly 12. Clamp 102 includes a base 106 that fits on base 90. Clamp member 104 includes a base 108 that fits on base 92. Clamp member 102 includes an ear 110 that is positioned outwardly of ear 82. Clamp 104 includes an ear 112 that is positioned endwise outwardly of the ear 84. Ear 102 includes a vertical slot 114 and ear 112 includes a vertical slot 116. Vertical slot 114 is alignable with threaded opening 86. Vertical slot 116 is alignable with threaded opening 88. A clamp screw 118 includes a threaded portion 120 that extends first through vertical slot 114, then through horizontal slot 98, and then screws into the threaded opening 86. In like fashion, a second clamp screw 122 includes a threaded portion 124 that extends first through vertical slot 116, then through horizontal slot 100 and then screws into the threaded opening 88. The hook 102 has a lower end portion with an inwardly directed lip 126. In like fashion, the hook 104 includes an inwardly directed bottom lip 128 at its lower end. Side plate 54 and side plate 60 have end edges 130, 132 that are adapted to set down onto the upper edges 134, 136 of end members 138, 140. End members 138, 140 include edges 142, 144 that are positioned above the hooks 126, 128. The slots 114, 116 allow the hooks 102, 104 to be adjusted upwardly to place the lips 126, 128 into contact with the edges 142, 144, before the clamp screws 118, 122 are tightened. The two presser plates 54, 56 are movable together and apart by a distance established by the slots 98, 100. As will be later described, the plates 54, 56 are moved relatively together or apart before the clamp screws 118, 122 are tightened.

Components to be cooled in the form of cards are positioned between the first and third pouch bodies 14, 18 and between the second and third pouch bodies 16, 18. Then, presser plate 54 is moved against pouch body 14 and presser plate 60 is moved against pouch body 16. This imposes a lateral force on the pouch bodies 14, 18 and 16, 18 which clamps the cards between the pouch bodies 14, 18 and 16, 18. The flexible nature of the sidewalls of the pouch bodies 14, 16, 18 causes the pouch bodies to move into tight engagement with the sides of the cards, deforming the bodies to the irregular shape of the surfaces of the cards that are in contact with the pouch bodies 14, 18 and 16,18.

Preferably, the center pouch body 16 is wider than the two side pouch bodies 14, 16. The larger size of the pouch body 18 allows it to hold sufficient cooling liquid to cool both of the cards that are on its opposite sides. Pouch bodies 14, 16, 18 are formed of a soft sheet material that is deformable to closely contact heat-generating elements having various shapes due to a contact pressure and is capable of smoothly circulating a coolant, and accommodates a filler 11 and a liquid coolant, e.g. water. The external shape and size of the pouch bodies 14, 16, 18 are determined by shapes and installation locations of the heat-generating elements. Preferably, the filler 11 is a porous sponge having a predetermined elasticity. The pouch bodies 14, 16, 18 are constructed to include space enough to allow the coolant to flow into and through the pouch bodies 14, 16, 18. In the illustrated embodiment, cards carrying elements that generate heat are held by holders having end walls such as shown in FIG. 3, on which end portions of the presser plates are supported. As shown by FIG. 3, clamps at the ends of the pouch body assembly function to connect the pouch body assembly to the end walls. In other installations, other structures can be used for connecting the pouch body assemblies to structure on the board.

Referring to FIGS. 5 and 6, an element to be cooled 130 is positioned between pouch bodies 14, 18 and an element 132 to be cooled is positioned between pouch bodies 16, 18. The side plates 60, 66 are moved relatively together, to press the pouch bodies 14, 16, 18 tightly against the sides of the elements 130, 132. This deforms the sidewalls of the pouches 114, 116, 118, making them deform and conform to the irregular side surfaces of the elements 130, 132.

The thickness of the filler body 11 can vary depending on the spacing of the elements 130, 132. The coolant entering the inlet 22 will fill the inner space of the pouch body 14, 16, 18 and will become absorbed by the filler body 11. In some installations, the force applied to the sidewalls of the pouch bodies 14, 16, 18 will compress the filler body 11. Water or other coolant flowing into the inlet 22 will flow through the filler body 11 to the outlet 24 where it will flow out from the pouch body 14, 16, 18 and into and through its outlet passageway 38 and into the outlet manifold.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A cooling system, comprising:
   a first pouch body formed of sheet material that is deformable, said first pouch body having first and second ends, an inlet for a cooling fluid at the first end and an outlet for the cooling fluid at the second end;
   a second pouch body formed of sheet material that is deformable, said second pouch body having first and second ends, an inlet for the cooling fluid at the first end and an outlet for the cooling fluid at the second end;
   an elongated support member for the first and second pouch bodies, said first and second pouch bodies being connected to the support member, side by side;
   a manifold block positioned adjacent the first and second pouch bodies, between inlets and the outlets for said pouch bodies, said manifold block including an inlet manifold and an outlet manifold; inlet conduits extending from the inlet manifold to the inlets for the pouch bodies and outlet conduits extending from the outlets for the pouch bodies to the outlet manifold;
   whereby a component to be cooled is positionable against the first and second pouch bodies and the cooling fluid is introduced into the inlet manifold and removed from the outlet manifold; and
   whereby the cooling fluid will flow from the inlet manifold through the conduits extending from the inlet manifold to the inlets for the pouches, and through the pouches to the outlets for the pouches, and from the outlets for the pouches through the outlet conduits back to the outlet manifold.

2. The cooling system of claim 1, comprising an inlet fitting at the first end of each pouch body, an outlet fitting at the second end of each pouch body, and a manifold housing between the inlet and outlet fittings, said manifold housing including the inlet manifold and the outlet manifold, said inlet conduits extending between the inlet manifold and the inlet fittings, and said outlet conduits extending between the outlet manifold and the outlet fittings.

3. The cooling system of claim 1, comprising a first presser plate outwardly adjacent the first pouch body, a second presser plate outwardly adjacent the second pouch body, and mounting means for the first and second presser plates mounting them for movement together and apart, wherein movement of the presser plates together will move the first and second pouch bodies against the component to be cooled.

4. A cooling system, comprising:
   a first pouch body formed of sheet material that is deformable, said first pouch body having first and second ends, an inlet for a cooling fluid at the first end and an outlet for the cooling fluid at the second end;
   a second pouch body formed of sheet material that is deformable, said second pouch body having first and second ends, an inlet for the cooling fluid at the first end and an outlet for the cooling fluid at the second end;
   a third pouch body formed of sheet material that is deformable, said third pouch body having first and second ends, an inlet for the cooling fluid at the first end and an outlet for the cooling fluid at the second end;
   said third pouch body being sandwiched between the first and second pouch bodies;
   a manifold block positioned adjacent to first, second and third pouch bodies, between inlets and the outlets for said pouch bodies, said manifold block including an inlet manifold and an outlet manifold;
   inlet conduits extending from the inlet manifold to the inlets for the pouch bodies and outlet conduits extending from the outlets for the pouch bodies to the outlet manifold; and
   said first and third pouch bodies being supported in close proximity of each other, and said second and third pouch bodies being supported in close proximity to each other, whereby a first component to be cooled can be positioned between the first and third pouch bodies, a second component to be cooled can be positioned between the second and third pouch bodies, and a coolant can be introduced into the inlet manifold to flow from the inlet manifold through the inlet conduits, into the inlets for the pouch bodies, through the pouch bodies, out from the outlets for the pouch bodies, through the outlet conduits to the outlet manifold, and outwardly from the outlet manifold.

5. The cooling system of claim 4, wherein the first pouch body has a first chamber volume for a coolant, said second pouch body has a second chamber volume for a cooling fluid, said second pouch body has a second chamber volume said cooling, and said third pouch body has a third chamber volume for said cooling fluid.

6. The cooling system of claim 5, wherein the chamber volume in the third pouch body is larger than the chamber volume in the first and second pouch bodies.

7. The cooling system of claim 4, further comprising inlet and outlet manifolds, inlet conduits extending from the inlet manifold to the inlets for the pouches, and outlet conduits extending from the outlets for the pouches to the outlet manifold.

8. The cooling system of claim 4, comprising a first presser plate outside of the first pouch body an a second presser plate outside of the second pouch body, said presser plates being movable relatively together and apart.

9. The cooling system of claim 4, comprising a first clamp endwise of the first ends of the first pouch bodies, and a second clamp endwise of the second ends of the pouch bodies, said clamps having spaced apart jaws which are movable together and apart.

10. A cooling system, comprising:
    a first support member having a first presser plate and a pair of ears, one in each end of the first support member, said ears being parallel to each other and perpendicular to the first presser plate;
    a second support member having a second presser plate spaced laterally from the first presser plate, and third and fourth ears at opposite ends of the second support member, said third and fourth ears being parallel to each other and perpendicular to the second presser plate;
    said first and second ears including screw-receiving including screw-receiving openings, and said third and fourth ears including screw receivable slots that are alignable with the screw-receiving openings;
    said third and fourth ears being positionable endwise outwardly of the first and second ears, with the slots in the third and fourth ears in registry with the openings in the first and second ears;

a first screw insertable through the slot in the third ear and threadable into the opening in the first ear;

a second screw insertable through the slot in the fourth ear and threadable into the opening in the second ear;

a plurality of pouch bodies formed of sheet material that is deformable, supported by the support structure between the first and second presser plates; and wherein said first and second presser members are movable towards and away from each other and an amount determined by the length of the slots, when the clamp screw is loosened, and said clamp screws being adapted to be tightened for clamping the first and third ears together and the second and fourth ears together, for holding the presser plates in fixed positions.

11. The cooling system of claim 10, wherein each pouch body has an inlet for a cooling fluid at a first end and an outlet for the cooling fluid at a second end.

12. The cooling system of claim 11, further comprising inlet and outlet manifolds, inlet conduits extending from the inlet manifold to the inlets for the pouches, and outlet conduits extending from the outlets for the pouches to the outlet manifold.

13. The cooling system of claim 10, comprising a first clamp endwise of the first ends of the pouch bodies, and a second clamp endwise of the second ends of the pouch bodies, said clamps having spaced apart jaws that are movable together and apart.

14. The cooling system of claim 13, wherein the first clamp including a fifth ear positionable endwise outwardly of the first ear and the second clamp includes a sixth ear position endwise outwardly of the second ear, said fifth ear including a vertical slot alignable with the opening in the first ear, and a said sixth ear including a vertical slot alignable with the opening in the second ear;

wherein the first clamp screw extends through the slot in the fifth ear and screws into the opening in the first ear, and the second clamp screw extends through the slot in the sixth ear and screws into the opening in the second ear; and said first clamp having a jaw spaced from and connected to the fifth ear, and said second clamp having a jaw spaced from and connected to the sixth ear, whereby the clamp screws can be loosened and the clamp members moved vertically and amount established by the length of the slots in the fifth and sixth ears, and the clamp screw can be tightened for clamping the fifth ear to the first ear and the sixth ear to the second ear.

* * * * *